United States Patent
Varada et al.

(10) Patent No.: US 11,687,630 B2
(45) Date of Patent: Jun. 27, 2023

(54) SECURED AUTHENTICATION TECHNIQUES WITH DYNAMISM AND CONNECTED OVERLAPPING INPUTS FROM VARIOUS SOURCES

(71) Applicant: International Business Machines Corporation, Armonk, NY (US)

(72) Inventors: Sri Harsha Varada, Vizianagaram (IN); Sunita Rani Nayak, Odisha (IN); Hari Krishna Prasad Bheemavarapu, Vizag (IN); Karthik Adatrow, Chelmsford, MA (US); Manish Anand Bhide, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 17/100,235

(22) Filed: Nov. 20, 2020

(65) Prior Publication Data
US 2022/0164434 A1    May 26, 2022

(51) Int. Cl.
*G06F 21/31*    (2013.01)
*G06F 21/46*    (2013.01)
(Continued)

(52) U.S. Cl.
CPC .............. *G06F 21/31* (2013.01); *G06F 21/32* (2013.01); *G06F 21/36* (2013.01); *G06F 21/46* (2013.01); *G06Q 20/401* (2013.01)

(58) Field of Classification Search
CPC .......... G06F 21/46; G06F 21/32; G06F 21/36; G06F 21/31; G06F 21/316
See application file for complete search history.

(56) References Cited

U.S. PATENT DOCUMENTS

| | | | | |
|---|---|---|---|---|
| 6,895,514 | B1 * | 5/2005 | Kermani | G06F 21/316 |
| | | | | 726/19 |
| 7,581,113 | B2 * | 8/2009 | Smith | G06F 21/31 |
| | | | | 726/28 |

(Continued)

FOREIGN PATENT DOCUMENTS

EP    3493088 A1    6/2019

OTHER PUBLICATIONS

Kuppusamy KS. PassContext and PassActions: transforming authentication into multi-dimensional contextual and interaction sequences. Journal of Ambient Intelligence and Humanized Computing. Apr. 2020;11(4):1467-94. (Year: 2020).*

(Continued)

*Primary Examiner* — James R Turchen
(74) *Attorney, Agent, or Firm* — Aaron Pontikos

(57) ABSTRACT

Aspects of the present invention disclose a method for dynamic password inducing techniques for security configuration and validation of a user. The method includes one or more processors identifying textual data of a user. The method further includes generating a set of password parameters for a password. The method further includes identifying one or more password dynamisms of the user from one or more sources, where the one or more password dynamisms are dynamic inputs, from the user, to an authentication device. The method further includes modifying the textual data to include a text placeholder, wherein the text placeholder includes a replacement parameter that induces the user to provide a password dynamism. The method further includes configuring the set of password parameters for the password of the user based at least in part on the one or more password dynamisms of the user from the one or more sources.

20 Claims, 3 Drawing Sheets

(51) Int. Cl.
  *G06Q 20/40* (2012.01)
  *G06F 21/32* (2013.01)
  *G06F 21/36* (2013.01)

(56) References Cited

U.S. PATENT DOCUMENTS

| | | | | |
|---|---|---|---|---|
| 8,145,913 | B1* | 3/2012 | Zaitsev | G06F 21/55 726/22 |
| 9,626,506 | B1* | 4/2017 | Shetty | H04L 63/0846 |
| 10,866,699 | B1* | 12/2020 | Hassan | G06V 20/80 |
| 2006/0143450 | A1* | 6/2006 | Airody Udupa | G06F 21/31 713/168 |
| 2007/0250920 | A1* | 10/2007 | Lindsay | G06F 21/31 726/7 |
| 2009/0282258 | A1* | 11/2009 | Burke | G06F 21/6281 713/184 |
| 2013/0318596 | A1* | 11/2013 | Huang | G06F 21/46 726/18 |
| 2014/0244511 | A1* | 8/2014 | Weller | G06Q 20/4016 705/44 |
| 2014/0310764 | A1 | 10/2014 | Tippett | |
| 2015/0033303 | A1* | 1/2015 | VanBlon | G06F 21/46 726/6 |
| 2017/0118642 | A1* | 4/2017 | Fukui | H04W 12/068 |
| 2018/0232591 | A1 | 8/2018 | Hicks | |
| 2020/0134002 | A1* | 4/2020 | Tung | H04L 63/20 |
| 2020/0134169 | A1* | 4/2020 | Sunkavally | G06N 20/00 |
| 2020/0272729 | A1* | 8/2020 | Regen | G06F 21/31 |
| 2020/0380585 | A1* | 12/2020 | Hare | H04W 12/35 |
| 2020/0387245 | A1* | 12/2020 | Chen | G06F 3/0202 |
| 2021/0064737 | A1* | 3/2021 | Streuter | G06F 21/46 |
| 2021/0192040 | A1* | 6/2021 | Kumar | G06F 21/31 |

OTHER PUBLICATIONS

"A secure and efficient user authentication solution", Publication Date Sep. 28, 2019, IP.com No. IPCOM000259894D, IP.com Electronic Publication Date: Sep. 28, 2019, 3 pps., <https://priorart.ip.com/IPCOM/000259894>.

Channabasava et al., "Dynamic Password Protocol for User Authentication", Jul. 2019, In book: Intelligent Computing (pp. 597-611), <https://www.researchgate.net/publication/334294958_>.

Fong et al., "A biometric authentication model using hand gesture", Biomed Eng Online. 2013; 12: 111, Published online Oct. 30, 2013, 29 pps., <imageshttps://www.ncbi.nlm.nih.gov/pmc/articles/PMC3874634/>.

Kaliyaperumal et al.,"Application Authentication: Facial Expression Password", Proceedings of the International Institute of Engineers: Jan. 15-16, 2014, 4 pps., Kuala Lumpur (Malaysia), <http://dx.doi.org/10.15242/IIE.E0114>.

Poh et al., "Hybrid Biometric Person Authentication Using Face and Voice Features", Paper presented in the Third International Conference, Audio- and Video-Based Biometric Person Authentication, AVBPA2001, Halmstad, Sweden, pp. 348-353, Jun. 2001, <https://www.researchgate.net/publication/2909478_Hybrid_Biometric_Person_Authentication_Using_Face_And_Voice_Features>.

Yin et al., "Fusion of Face Recognition and Facial Expression Detection for Authentication: A Proposed Model", IMCOM '17, Jan. 5-7, 2017, Beppu, Japan, 8 pps., <https://www.researchgate.net/publication/313584884_Fusion_of_face_recognition_and_facial_expression_detection_for_authentication_a_proposed_model>.

* cited by examiner

SECURED AUTHENTICATION TECHNIQUES WITH DYNAMISM AND CONNECTED OVERLAPPING INPUTS FROM VARIOUS SOURCES

BACKGROUND OF THE INVENTION

The present invention relates generally to the field of data communications, and more particularly to information security.

In recent years, the development and the growth of Internet of Things (IoT) capable devices have created a wealth of opportunities to advance the capabilities and the use of computer technologies to perform financial and other high value transactions continues to increase. Due to the nature of these transactions, authentication of the parties involved in the transaction is critical. Authentication traditionally takes one of three forms, referred to as factors—something the user is (e.g., fingerprint, retinal scan, etc.), something the user has (e.g., smart card, ID card, computing device, etc.), or something the user knows (e.g., PIN, password, etc.).

Maintaining secure logon practices is critical to many web sites and applications, including financial, business and governmental web sites. A common way that an end user is authenticated prior to accessing a web site (or application) is by the end user providing a password to the web site, where software that executes on the web site authenticates the password provided before granting to the end user access to the web site. However, because passwords may be lost or compromised, a second method (i.e., second level) of authentication is sometimes used. This second method may involve providing personal information that is typically in the end user's sole possession, such as a mother's maiden name or a one-time password generated by a token device. Typically, these backup authentication methods are employed when an existing customer uses a new device, such as a PC, tablet, or smartphone, to access the secure web site or application.

SUMMARY

Aspects of the present invention disclose a method, computer program product, and system for dynamic password inducing techniques for security configuration and validation of a user. The method includes one or more processors identifying textual data of a user. The method further includes one or more processors generating a set of password parameters for a password, wherein the password configuration includes the textual data of the user. The method further includes one or more processors identifying one or more password dynamisms of the user from one or more sources, where the one or more password dynamisms are dynamic inputs, from the user, to an authentication device. The method further includes one or more processors modifying the textual data to include a text placeholder, wherein the text placeholder includes a replacement parameter that induces the user to provide a password dynamism of the one or more password dynamisms of the user from the one or more sources. The method further includes one or more processors configuring the set of password parameters for the password of the user based at least in part on the one or more password dynamisms of the user from the one or more sources.

DETAILED DESCRIPTION

Embodiments of the present invention allow for utilization of dynamic password inducing techniques for security configuration and validation of a user, system, product, and/or account that require high end security features. Embodiments of the present invention configure one or more password dynamics for a user. Additional embodiments of the present invention utilize various inputs of various sources to validate a user. In further embodiments of the present invention determine whether a contextual password of a user is compromised.

Some embodiments of the present invention recognize that as digitalization increases so does the need for security advancements within the field of authentication. Additional embodiments of the present invention recognize that there is no one-stop solution for authentication and validation in securing systems. Various embodiments of the present invention remedy such challenges by adding additional layers of security to authentication mechanisms, which will strengthen security and improve the authentication process. In addition to deterring circumvention attempts by unauthorized users, embodiments of the present invention provide the user with a seamless user experience.

Embodiments of the present invention recognize that computing systems hosting sensitive information and/or subscriber services receive a substantial amount traffic that includes authentication requests, which may be malicious or invalid. As a result, the computing systems utilizes a substantial amount of processing resources processing the malicious and/or invalid authentication requests. Various embodiments of the present invention can operate to increase the efficiency and security of the computing system by reducing the amount of processing resources utilized to process and return a response to the malicious and/or invalid authentication requests. The embodiments of the present invention can improve security of the computing system utilization by implementing the generation of dynamic contextual passwords based on generated rules corresponding to the request that include combinations of inputs from various sources and predefined sequential time-lapses.

Implementation of embodiments of the invention may take a variety of forms, and exemplary implementation details are discussed subsequently with reference to the Figures. Some embodiments will be described in more detail with reference to the accompanying drawings, in which the embodiments of the present invention have been illustrated. However, the present invention can be implemented in various manners, and thus should not be construed to be limited to the embodiments disclosed herein.

Figure 1:
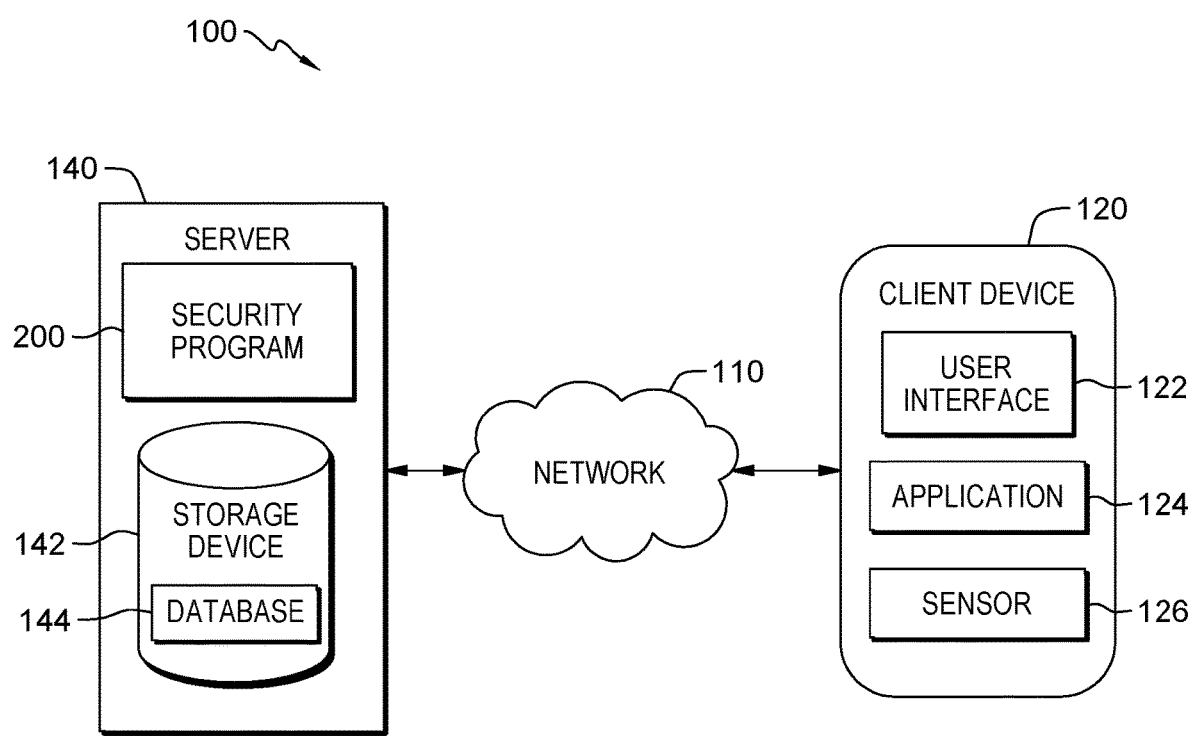
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as database 144 and client device 120, which may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Security program 200 enables the authorized and secure processing of personal data. Security program 200 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Security program 200 provides information regarding personal data and the nature (e.g., type, scope, purpose, duration, etc.) of the processing. Security program 200 provides the user with copies of stored personal data. Security program 200 allows the correction or completion of incorrect or incomplete personal data. Security program 200 allows the immediate deletion of personal data.

Distributed data processing environment 100 includes server 140 and client device 120, all interconnected over network 110. Network 110 can be, for example, a telecommunications network, a local area network (LAN) a municipal area network (MAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 140 and client device 120, and other computing devices (not shown) within distributed data processing environment 100.

Client device 120 can be one or more of a laptop computer, a tablet computer, a smart phone, smart watch, a smart speaker, virtual assistant, or any programmable electronic device capable of communicating with various components and devices within distributed data processing environment 100, via network 110. In general, client device 120 represents one or more programmable electronic devices or combination of programmable electronic devices capable of executing machine readable program instructions and communicating with other computing devices (not shown) within distributed data processing environment 100 via a network, such as network 110. Client device 120 may include components as depicted and described in further detail with respect to FIG. 3, in accordance with embodiments of the present invention.

Client device 120 includes user interface 122, application 124, and sensor 126. In various embodiments of the present invention, a user interface is a program that provides an interface between a user of a device and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, e-mail program, or other media, etc.). In one embodiment, application 124 is mobile application software. For example, mobile application software, or an "app," is a computer program designed to run on smart phones, tablet computers and other mobile devices. In another embodiment, application 124 is a web user interface (WUI) and can display text, documents, web browser windows, user options, application interfaces, and instructions for operation, and include the information (such as graphic, text, and sound) that a program presents to a user and the control sequences the user employs to control the program. In another embodiment, application 124 is a client-side application of security program 200.

Sensor 126 is a device, module, machine, or subsystem that detects events or changes in an environment of the device and sends the information to other electronics. In one embodiment, sensor 126 represents a variety of sensors of client device 120 that collects and provides various kinds of data. In this embodiment, sensor 126 provides information about a user to server 140. For example, sensor 126 can capture data corresponding to audio, gaze tracking, and body motion etc., of a user and transmit the data to database 144.

In various embodiments of the present invention, server 140 may be a desktop computer, a computer server, or any other computer systems, known in the art. In general, server 140 is representative of any electronic device or combination of electronic devices capable of executing computer readable program instructions. Server 140 may include components as depicted and described in further detail with respect to FIG. 3, in accordance with embodiments of the present invention.

Server 140 can be a standalone computing device, a management server, a web server, a mobile computing device, or any other electronic device or computing system capable of receiving, sending, and processing data. In one embodiment, server 140 can represent a server computing system utilizing multiple computers as a server system, such as in a cloud computing environment. In another embodiment, server 140 can be a laptop computer, a tablet computer, a netbook computer, a personal computer (PC), a desktop computer, a personal digital assistant (PDA), a smart phone, or any programmable electronic device capable of communicating with client device 120 and other computing devices (not shown) within distributed data processing environment 100 via network 110. In another embodiment, server 140 represents a computing system utilizing clustered computers and components (e.g., database server computers, application server computers, etc.) that act as a single pool of seamless resources when accessed within distributed data processing environment 100.

Server 140 includes storage device 142, database 144, and security program 200. Storage device 142 can be implemented with any type of storage device, for example, memory 28, which is capable of storing data that may be accessed and utilized by client device 120 and server 140, such as a database server, a hard disk drive, or a flash memory. In one embodiment storage device 142 can represent multiple storage devices within server 140. In various embodiments of the present invention, storage device 142 stores numerous types of data which may include database 144. Database 144 may represent one or more organized collections of data stored and accessed from server 140 and client device 120. For example, database 144 includes sensor data, user interface inputs, images, audio, generated configurations, passwords, etc. In one embodiment, data processing environment 100 can include additional servers (not shown) that host additional information that accessible via network 110.

Generally, security program 200 can generate dynamism within a password by utilizing overlapping inputs of various sources to configure the password and validate a user. For example, security program 200 generates a dynamic password by using combinations of inputs sources of client device 120 (e.g., camera, mic, touch, etc.) with a predefined sequential time-lapsed approach. In this example, security program 200 utilizes plain text of a password provided by a user and adds one or more time-lapses and/or user task to segments of an entry sequence of the password by the user. Additionally, security program 200 configures the password by assigning an input from different sources to the one or more time-lapses. As a result, security program 200 can utilize plain text of the password "HackerRank" and generate a dynamic password "H<10SecondsGap>acker<5SecondsGap>Ran<Eyeblink>k" which includes the plain text and configured dynamisms (e.g., predefined sequential time-lapse entries, custom functions, etc.) as password parameters. In another example, security program 200 can utilize context or defined scenarios to configure a password text placeholder, which is replaced with image-text, color, gesture, time-gap, etc., as discussed in the previous example, to provide dynamism to a password of a user. As a result, security program 200 can be utilized in other types of password authentication techniques using, but not limited to plain text, pattern-based, drag-and-drop, and gesture-based methods.

Figure 2:
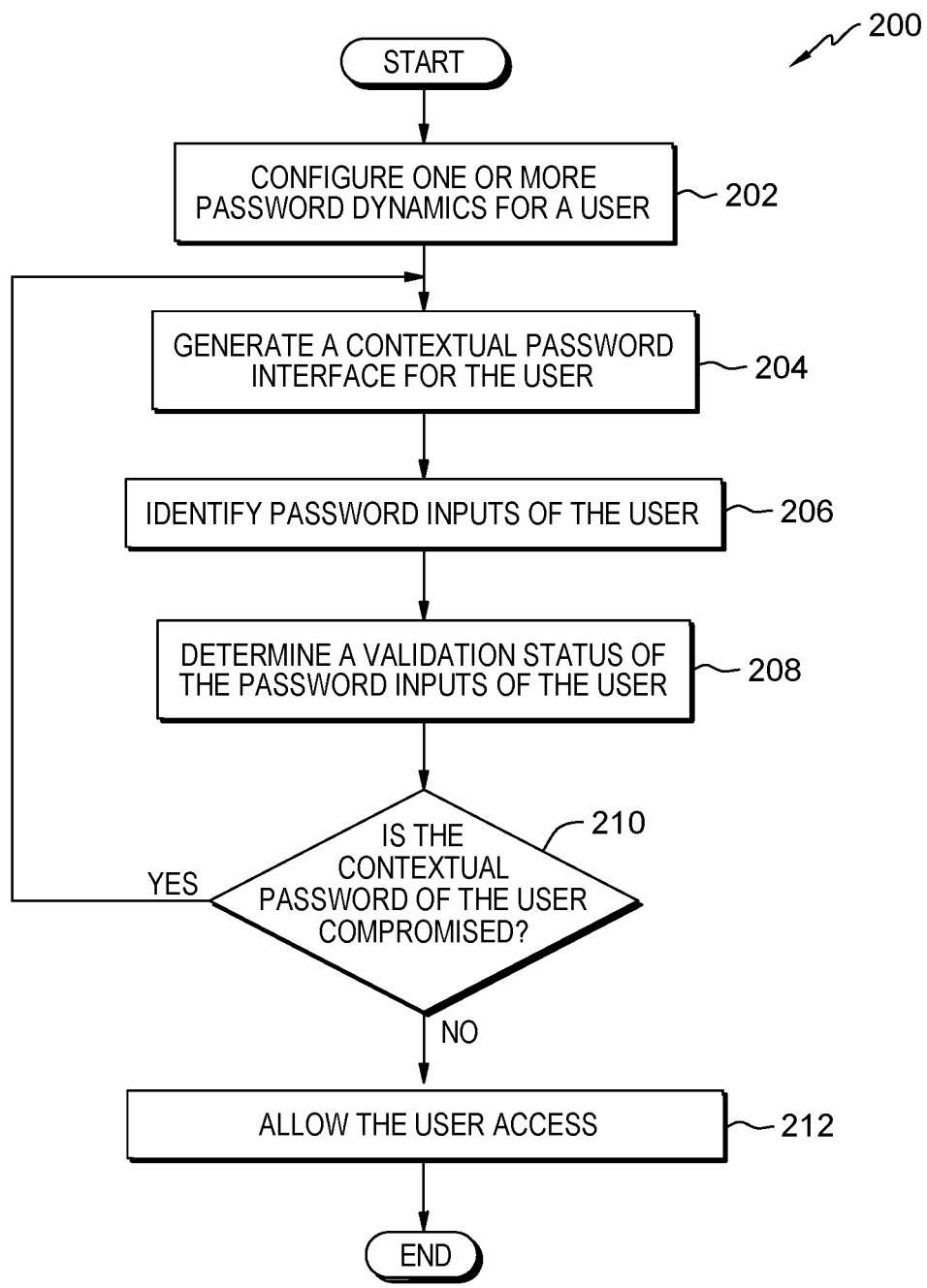
FIG. 2 is a flowchart depicting operational steps of a program, within the data processing environment of FIG. 1, for dynamic password inducing techniques for security configuration and validation of a user, in accordance with embodiments of the present invention.

FIG. 2 is a flowchart depicting operational steps of security program 200, a program that utilizes dynamic password inducing techniques for security configuration and validation of a user, system, product, and/or account that require high end security features, in accordance with embodiments of the present invention. In one embodiment, security program 200 initiates in response to a user connecting client device 120 to security program 200 through network 110. For example, security program 200 initiates in response to a user registering (e.g., opting-in) a laptop (e.g., client device 120) with security program 200 via a WLAN (e.g., network 110). In another embodiment, security program 200 is a background application that continuously monitors client device 120. For example, security program 200 is a client-side application (e.g., application 124) that initiates upon booting of a laptop (e.g., client device 120) of a user and monitors the laptop for an authentication prompt.

In step 202, security program 200 configures one or more password dynamics for a user. In one embodiment, security program 200 generates one or more password parameters for a password configuration of client device 120. For example, security program 200 generates one or more password text placeholders of a password that include replacement parameters (e.g., biometric data, image-text, images, color, gesture, time lapsed entry, etc.) from various input sources (e.g., client device 120, sensor 126, application 124, server 140, etc.) that can be utilized to configure a password of a user to secure access to systems, products, accounts, etc. of the user. In this example, security program 200 can configure the password of a user prior to or while the user inputs the password. Additionally, security program 200 can utilize a determined context to configure the password of the user.

In various embodiments of the present invention, password parameters of a contextual password of security program 200 can include one or more dynamic password inducing techniques. For example, security program 200 can generate a replacement parameter for one or more password text placeholders of a password that includes a time lapsed key stroke entry with a defined delta (e.g., time period) of a user, which can be based on a system defined time period or preferences of the user. In this example, security program 200 can utilize textual data of the password (e.g., HackerRank) provided by the user and input a defined delta (e.g., time-period) in a password text placeholder of the one or more password text placeholders of the password. Additionally, when a user enters the password in order to satisfy the defined delta of the password text place holder, the user can say a phrase in the user's mind and then continue entering textual data of the password. As a result, security program 200 can utilize plain text of the password "HackerRank" and the time lapsed keystroke entry to generate a dynamic password configuration "H21 10SecondsGap>acker<5SecondsGap>Rank" which includes plain text and user tasks as password parameters. Furthermore, security program 200 can utilize a threshold time-period (e.g., +/–'x' seconds) to determine whether the defined delta is satisfied.

In another example, security program 200 can generate a replacement parameter for one or more password text placeholders of a password that includes text of a background of an image of a user. In this example, security program 200 can utilize textual data of the password (e.g., HackerRank) provided by the user and input textual data of a background of an image that includes the user in a password text placeholder of the one or more password text placeholders. Additionally, security program 200 can utilize natural language processing techniques (e.g., optical character recognition, etc.) to identify the textual data of the background of the image. As a result, security program 200 can utilize a plain text of the password "HackerRank" and if the background of the image of the user includes "KFC", then security program 200 trigger a dynamic password configuration "H<BackgroudImage>ackerRank" which includes plain text and the textual data of the background of the image as password parameters. In an example embodiment, security program 200 can generate a password using the dynamic password configuration that would result in "HKFCackerRank".

In an alternative example, security program 200 can generate a replacement parameter for one or more password text placeholders of a password that includes text of the foreground of an image of a user. In another alternative example, security program 200 can generate a replacement parameter for one or more password text placeholders of a password that includes an image of a pre-authenticated private image stack of a user stored on a database (e.g., database 144) of a server.

In another example, security program 200 can generate a replacement parameter for one or more password text placeholders of a password that includes the color of an object captured in an image of a computing device (e.g., client device 120) of a user. In this example, security program 200 can utilize machine learning algorithms (e.g., artificial neural networks) to perform computer vision techniques (e.g., object detection, identification, recognition, etc.) to detect an object in a frame of a camera (e.g., sensor 126) of the computing device of the user and determine a color corresponding to the object. Additionally, security program 200 can utilize a password (e.g., HackerRank) provided by the user and input the color (e.g., orange) of the object in a password text placeholder of the one or more password text placeholders of the password. As a result, security program 200 can utilize plain text of the password "HackerRank" and the color of the object to generate a dynamic password configuration "H<ObjectColor>ackerRank" (e.g., HorangeackerRank).

In another example, security program 200 can generate a replacement parameter for one or more password text placeholders of a password that includes linked device activities. In this example, security program 200 can utilize textual data of the password (e.g., HackerRank) provided by the user and a user task (e.g., open screen of computing device, power off, etc.) with a linked device (e.g., one or more instances of client device 120) in a password text placeholder of the one or more password text placeholders of the password. As a result, security program 200 can utilize plain text of the password "HackerRank" and the user task of the linked device to trigger a dynamic password configuration "H<OpenScreenOfDevice>acker<PowerOff>Rank". Additionally, when the user enters the password in order to satisfy the user task of the password text place holder the user must perform the user task (e.g., perform device function) and then continues entering textual data of the password.

In another example, security program 200 can generate a replacement parameter for one or more password text placeholders of a password that includes a user configured dynamic function with inputs from external sources. In this example, security program 200 can utilize textual data of the password (e.g., HackerRank) provided by the user and a dynamic user configured function in a password text placeholder of the one or more password text placeholders of the password to generate a dynamic password configuration "H<DynamicFunction>ackerRank" (e.g., f(x)={No.Of EyeBlinks User Do}+{No.of Vowels in Shirt Color}). In an example, embodiment, if security program 200 determines the user performs three (3) eyeblinks after entering the letter "H" based on a machine learning algorithm trained to identify facial gestures (e.g., image processing, neural network, classifiers, etc.) and is wearing a "Blue" (e.g., color) shirt based on computer vision and NLP techniques (i.e., f(x)=3(eyeblinks)+2(Vowels in the shirt color blue)=5). As a result, security program 200 can utilize plain text of the password "HackerRank" and an output of the user configured dynamic function to trigger a dynamic password configuration resulting in the password "H5ackerRank".

In another embodiment, security program 200 generates two or more password configurations for application 124 of client device 120. For example, security program 200 utilizes a set of conditions (e.g., a context) within an operating environment of a computing device when a user is enter a password, which enables security program 200 to dynamically select one of multiple configured passwords of the user for access to a computing device (e.g., client device 120). Additionally, each of the multiple configured passwords of the user correspond to a context and are only valid when a corresponding context is present in the operating environment of the computing device. In yet another embodiment, security program 200 generates one or more password parameters for password configurations for two or more users in a joint operation to access application 124 of client device 120.

Various embodiments of the present invention provide for gesture enabled invocation of dynamics configured with above mentioned embodiments, which is a useful security measure, when a user is attempting to use an account from publicly available network connection (e.g., network 110) where security standards are unknown to the user. For example, if security program 200 determines a user displays five (5) fingers prior to entering a password, then security program 200 triggers the configured dynamism for the password, otherwise security program 200 ignores the configured dynamism. As a result, security program 200 providing the dynamism configuration in a password as discussed above adds an additional layer of security to the password (i.e., makes the password more secure).

In step 204, security program 200 generates a contextual password interface for the user. In one embodiment, security program 200 customizes user interface 122 for a user of client device 120. For example, security program 200 generates a widget for inputs to user interfaces (e.g., user interface 122) and sensors (e.g., sensor 126) of a computing device (e.g., client device 120) as well as external sources (e.g., server 140) to allow a user to generate an amalgamated password that can include input keystrokes and configured dynamisms (e.g., facial gestures, audio inputs, images, text, user tasks, etc.).

In another example, security program 200 utilizes a user interface (e.g., user interface 122) of the computing device (e.g., client device 120) of the user to allow the user to seamlessly configure password dynamism, as discussed in step 202, through various customized widgets (e.g., application 124) that are configured with options such as plain text, pattern and/or gesture-based methods, but not limited to drag and drop. In this example, security program 200 enables the user to utilize the user interface to generate an amalgamated password based on the drag and drop selection of configured dynamisms of the user. As a result, security program 200 advances security authentication methods by allowing a user based seamless configuration of amalgamated passwords (as mentioned in the above in step 202) through the various customized widgets. Additionally, security program 200 can identify a user and recommend dynamism configurations from the drag and drop widget option using an activity history of the user.

In one scenario, security program 200 determines an identity of a user and determines from an activity history of the user that the user wears different colors of shirts, which the user changes frequently. Additionally, security program 200 can recommend a "<ShirtColor>" dynamism widget to the user in addition to the one or more other selected dynamism widgets (e.g., time-lapsed entry, background text, foreground text, multiple users, user defined function, etc.) to configure a password for the user. In this scenario, security program 200 prompts the user to perform password parameters (e.g., dependent source actions), provide confirmation, and saves the configuration of the password parameters and dynamism configurations.

In step 206, security program 200 identifies password inputs of the user. In one embodiment, security program 200 identifies one or more inputs of a user corresponding to a password to access client device 120. For example, security program 200 identifies an authentication prompt of a computing device (e.g., client device 120) to access a secured program (e.g., application 124) of the computing device. In this example, security program 200 identifies textual data provided by the user and utilizes machine learning algorithms to identify completion of user task, gestures, objects, and/or images provided by the user to gain access to the secured program of the computing device.

In an example embodiment, security program 200 has created a multi-password safeguard for application 124 that is configured with a contextual dynamism. In this example, security program 200 identifies an authentication prompt of client device 120 to access application 124 and initiates monitoring of sensor 126 and user interface 122 for inputs of a user. For example, if security program 200 configures application 124 with a contextual dynamism based on a gesture (e.g., if the user waves a hand, then "Password1" is valid, if the user does not wave a hand, then "Password2" is valid) provided by the user, then security program 200 monitors sensor 126 based on a gesture-based password dynamic configuration (i.e., identifying input sources based on password parameter types and/or dynamics configurations). Additionally, security program 200 utilizes a machine learning algorithm to identify gestures provided by the user using images of sensor 126.

In step 208, security program 200 determines a validation status of the password inputs of the user. In one embodiment, security program 200 validates a password input of a user to access client device 120. For example, security program 200 compares inputs of a user to a saved password configuration. In this example, security program 200 determines whether the inputs of the user are provided in the exact way as the saved password configuration to authenticate a request of the user to access a computing device (e.g., client device 120).

In another example, security program 200 compares a replacement parameter (e.g., pre-authenticated image) of a password text placeholder provided as an input by a user to a replacement parameter of a saved password configuration to authenticate a request of the user to access a computing device (e.g., client device 120). In this example, security program 200 identifies a top image from a pre-authenticated image stack (e.g., database 144) between a server (e.g., server 140) and the user, which can be managed by password manager software, and compares the top image to an image (e.g., replacement parameter) the user provides while entering the password. Security program 200 can determine a validation status of the user based on a determination of whether the top image and the image the user provides are a match. Additionally, security program 200 can consider the image match as well as textual data input to determine a validation status of the user.

In another example, security program 200 compares inputs of two of more users to a saved password configuration for each of the respective users to access an account (e.g., application 124) with a joint operation enabled by two or more users. In this example, the account requires the two or more users to provide passwords to perform a task of the account, and security program 200 determines whether the inputs of the two or more users provide match respective saved password configurations for each user in order to authenticate a request of the users to perform the task of the account (i.e., enforce password dynamics for each user to determine validation status). Additionally, security program 200 can configure dynamics (e.g., time gap between entries of passwords, user actions/gestures, etc.) between the entry of the first password of a first user and a second password of a second user. In an example embodiment, security program 200 can utilize a single password box where all the users enter respective passwords with respective defined dynamics to determine a validation status. In another example embodiment, security program 200 can utilize password entry from a remote location and inputs from various sources merged together and cascaded to security program 200 for validation.

In decision step 210, security program 200 determines whether the contextual password of the user is compromised. In one embodiment, security program 200 utilizes client device 120 to determine whether a password provided by a user is secure. For example, security program 200 determines whether a password of a user is made vulnerable to attack or misuse by unauthorized access, revelation, and/or exposure (i.e., compromised). In this example, security program 200 can periodically utilizes a sanity check (e.g., validation transaction) to determine whether a password of an account (e.g., application 124) of computing device (e.g., client device 120) is compromised by transmitting an SMS or notification to the user of the computing device requesting the user to perform interactive gestures (e.g., pre-defined) along with password entry. If security program 200 does not identify the interactive gestures, then security program 200 generates a compromised flag for the account and can recommend changing the password. In another example, security program 200 utilizes a pre-authenticated image to determine whether a password provided by a user is secure. In this example, security program 200 determines whether the pre-authenticated image of the user is compromised due to revelation and/or exposure (e.g., availability in any social media or accessible for image crawlers etc.).

In another embodiment, if security program 200 determines that a password provided by a user is secure (decision step 210, "NO" branch), then security program 200 allows a user to access application 124 of client device 120. For example, if security program 200 transmits a notification corresponding to a sanity check to a computing device (e.g., client device 120) of a user and determines that one or more interactive gestures (e.g., pre-defined) and password entries (e.g., textual data) of the user provides are valid, then security program 200 allows the user to access an account (e.g., application 124) of the computing device.

In another embodiment, if security program 200 determines that a password provided by a user is not secure (decision step 210, "YES" branch), then security program 200 reconfigures password dynamics of the password. For example, if security program 200 utilizes an image web crawler that identifies a pre-authenticated image of a private image stack (e.g., database 144) on a social media site, then security program 200 can automatically inactivate the pre-authenticated image and pull the next pre-authenticated image in the private image stack to utilize in the password going forward.

In step 212, security program 200 allows the user access. In one embodiment, security program 200 grants a user access to client device 120. For example, security program 200 allows a user to access an account (e.g., application 124) of a computing device (e.g., client device 120).

Figure 3:
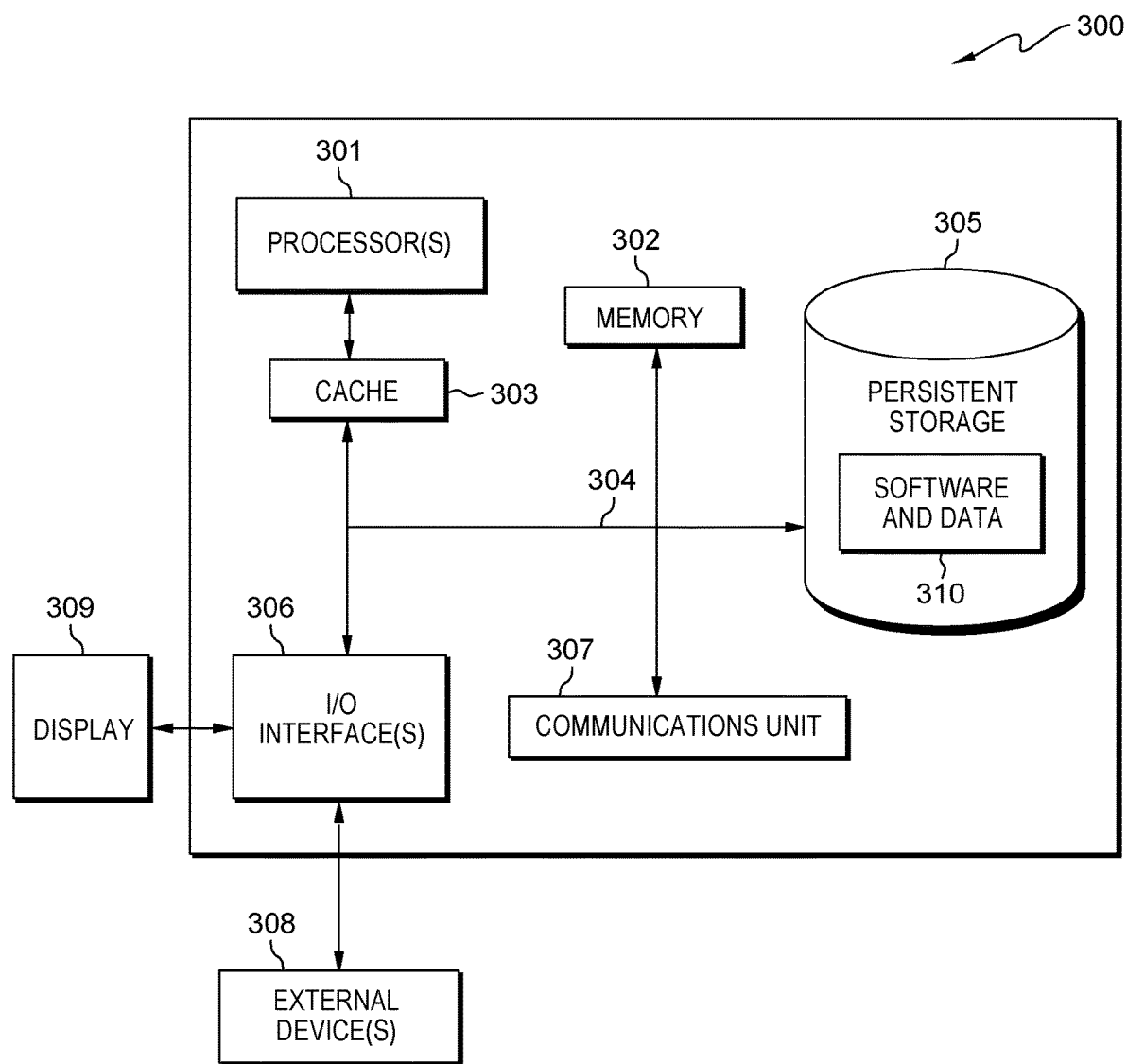
FIG. 3 is a block diagram of components of FIG. 1, in accordance with an embodiment of the present invention.

FIG. 3 depicts a block diagram of components of client device 120 and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

FIG. 3 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to client device 120, software and data 310 includes data of user interface 122, application 124, and sensor 126. With respect to server 140, software and data 310 includes data of storage device 142 and security program 200.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   identifying, by one or more processors, textual data of a password received from a computing device of a user;
   generating, by one or more processors, a set of password parameters for the password, wherein the set of password parameters includes the identified textual data;
   receiving, by one or more processors, one or more password dynamisms of the user from one or more sources, where the one or more password dynamisms are dynamic inputs by the user, to an authentication device;
   detecting, by one or more processors, a user task indicating invocation of at least one of the password dynamism of the user from the one or more sources to be included in configuration of the set of password parameters for the password, wherein the user task is monitored by an image monitoring input device communicatively connected to the computing device of the user;
   modifying, by one or more processors, the textual data to include a text placeholder, wherein the text placeholder includes a replacement parameter that induces the user to provide a password dynamism of the one or more password dynamisms of the user from the one or more sources; and
   configuring, by one or more processors, the set of password parameters for the password of the user based at least in part on the one or more password dynamisms of the user from the one or more sources, in combination with a predefined sequential time-lapsed entry of the one or more password dynamisms.

2. The method of claim 1, wherein configuring the set of password parameters for the password of the user based at least in part on the one or more password dynamisms of the user from the one or more sources, further comprises:
   determining, by one or more processors, one or more sets of conditions of an operating device of a computing device of the user; and
   generating, by one or more processors, one or more password configurations, wherein respective instances of the one or more password configurations correspond to a respective condition instance of the one or more sets of conditions.

3. The method of claim 1, wherein configuring the set of password parameters for the password of the user based at least in part on the one or more password dynamisms of the user from the one or more sources, further comprises:
  defining, by one or more processors, a time period corresponding to the replacement parameter that includes a time-lapse key stroke entry password dynamism for the set of password parameters.

4. The method of claim 1, wherein configuring the set of password parameters for the password of the user based at least in part on the one or more password dynamisms of the user from the one or more sources, further comprises:
  identifying, by one or more processors, an image including the user; and
  modifying, by one or more processors, the text placeholder of the textual data to include text identified within the image.

5. The method of claim 1, wherein at least one password text placeholder includes a replacement parameter of a time-lapse period in combination with at least one additional text placeholder replacement parameter, within the textual data provided by the user.

6. The method of claim 1, wherein the password text placeholder that includes a replacement parameter of a time-lapse period also includes a threshold time range to determine if the time-lapse period is satisfied.

7. The method of claim 1, wherein the password text placeholder includes a replacement parameter of a color of an object in an image provided by the user.

8. The method of claim 1, wherein the password text placeholder includes a dynamic user configured function as a replacement parameter for one or more password text placeholders.

9. The method of claim 1, wherein the password text placeholder includes a replacement parameter of the user task performed as part of the password entry, wherein the user task performed is selected from a group consisting of text within an image and objects within an image, presented by the user to an image capturing input device.

10. The method of claim 1, further comprising:
  in response to receiving input from the computing device of the user matching the password and including the one or more password dynamisms of the user corresponding to the configured set of password parameters for the password of the user, granting access associated with the password, to the user; and
  sending, by one or more processors, a validation message to the computing device of the user, periodically, requesting the user to perform another user task along with password entry.

11. The method of claim 1, wherein the user task includes one or a combination selected from a group consisting of, a facial gesture, eye movement, blinking, head movement, a hand or finger wave movement.

12. A computer program product comprising:
  one or more computer readable storage media and program instructions stored on the one or more computer readable storage media, the program instructions comprising:
  program instructions to identify textual data of a password received from a computing device of a user;
  program instructions to generate a set of password parameters for the password, wherein the set of password parameters include the textual data received;
  program instructions to receive one or more password dynamisms of the user from one or more sources, where the one or more password dynamisms are dynamic inputs by, the user, to an authentication device;
  program instructions to detect a user task indicating invocation of at least one of the password dynamisms of the user from the one or more sources to be included in configuration of the set of password parameters for the password, wherein the user task is monitored by an image monitoring input device communicatively connected to the computing device of the user;
  program instructions to modify the textual data to include a text placeholder, wherein the text placeholder includes a replacement parameter that induces the user to provide a password dynamism of the one or more password dynamisms of the user from the one or more sources; and
  program instructions to configure the set of password parameters for the password of the user based at least in part on the one or more password dynamisms of the user from the one or more sources, in combination with a predefined sequential time-lapsed entry of the one or more password dynamisms.

13. The computer program product of claim 12, wherein program instructions to configure the set of password parameters for the password of the user based at least in part on the one or more password dynamisms of the user from the one or more sources, further comprise program instructions to:
  determine one or more sets of conditions associated with an operating device connected to a computing device of the user; and
  generate one or more password configurations, wherein respective instances of the one or more password configurations correspond to a respective condition instance of the one or more sets of conditions.

14. The computer program product of claim 12, wherein program instructions to configure the set of password parameters for the password of the user based at least in part on the one or more password dynamisms of the user from the one or more sources, further comprise program instructions to:
  define a time period corresponding to the replacement parameter that includes a time-lapse key stroke entry password dynamism for the set of password parameters.

15. The computer program product of claim 12, wherein program instructions to configure the set of password parameters for the password of the user based at least in part on the one or more password dynamisms of the user from the one or more sources, further comprise program instructions to:
  identify an image including the user; and
  modify a text placeholder of the one or more textual data to include text identified within the image.

16. The computer program product of claim 12, further comprising program instructions stored on the one or more computer readable storage media, to:
  include at least one password text placeholder in which a replacement parameter of a time-lapse period is in combination with at least one additional text placeholder replacement parameter, within the textual data provided by the user.

17. A computer system comprising:
  one or more computer processors;
  one or more computer readable storage media; and
  program instructions stored on the computer readable storage media for execution by at least one of the one or more processors, the program instructions comprising:

program instructions to identify textual data of a password received from a computing device of a user;
program instructions to generate a set of password parameters for the password, wherein the password parameters include the textual data received;
program instructions to receive one or more password dynamisms of the user from one or more sources, where the one or more password dynamisms are dynamic inputs by the user, to an authentication device;
program instructions to detect a user task indicating invocation of at least one of the password dynamisms of the user from the one or more sources to be included in configuration of the set of password parameters for the password, wherein the user task is monitored by an image monitoring input device communicatively connected to the computing device of the user;
program instructions to modify the textual data to include a text placeholder, wherein the text placeholder includes a replacement parameter that induces the user to provide a password dynamism of the one or more password dynamisms of the user from the one or more sources; and
program instructions to configure the set of password parameters for the password of the user based at least in part on the one or more password dynamisms of the user from the one or more sources, in combination with a predefined sequential time-lapsed entry of the one or more password dynamisms.

18. The computer system of claim 17, wherein program instructions to configure the set of password parameters for the password of the user based at least in part on the one or more password dynamisms of the user from the one or more sources, further comprise program instructions to:
  determine one or more sets of conditions associated with an operating device connected to a computing device of the user; and
  generate one or more passwords configurations, wherein respective instances of the one or more passwords configurations correspond to a respective condition instance of the one or more sets of conditions.

19. The computer system of claim 17, wherein configure the set of password parameters for the password of the user based at least in part on the one or more password dynamisms of the user from the one or more sources, further comprise program instructions to:
  define a time period corresponding to the replacement parameter that includes a time-lapse key stroke entry password dynamism for the set of password parameters.

20. The computer system of claim 17, wherein program instructions include at least one password text placeholder in which a replacement parameter of a time-lapse period is in combination with at least one additional text placeholder replacement parameter, within the textual data provided by the user.

* * * * *